United States Patent
Ramsey et al.

(10) Patent No.: US 10,267,398 B2
(45) Date of Patent: Apr. 23, 2019

(54) TORQUE CONVERTER INCLUDING AXIALLY MOVABLE TURBINE AND FRICTION MATERIAL BONDED TO DIAPHRAGM SPRING

(71) Applicant: Schaeffler Technologies AG & Co. KG, Herzogenaurach (DE)

(72) Inventors: John Ramsey, Lucas, OH (US); Markus Steinberger, Macedonia, OH (US); Jacob Rufener, Rittman, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 561 days.

(21) Appl. No.: 14/858,898

(22) Filed: Sep. 18, 2015

(65) Prior Publication Data

US 2016/0084364 A1 Mar. 24, 2016

Related U.S. Application Data

(60) Provisional application No. 62/054,165, filed on Sep. 23, 2014.

(51) Int. Cl.
*F16H 45/02* (2006.01)
*F16H 41/28* (2006.01)

(52) U.S. Cl.
CPC ..... *F16H 45/02* (2013.01); *F16H 2045/0205* (2013.01); *F16H 2045/0226* (2013.01); *F16H 2045/0278* (2013.01)

(58) Field of Classification Search
CPC ............. F16H 45/02; F16H 2045/0205; F16H 2045/0226; F16H 2045/0273; F16H 2045/0278; F16H 2045/0284; F16H 2045/0289; F16H 2045/0294

See application file for complete search history.

(56) References Cited

U.S. PATENT DOCUMENTS

| | | | |
|---|---|---|---|
| 4,445,607 A | 5/1984 | Knight | |
| 6,003,647 A | 12/1999 | Kawamura et al. | |
| 6,024,195 A * | 2/2000 | Hinkel | F16H 45/02 192/3.28 |
| 6,494,303 B1 | 12/2002 | Reik et al. | |
| 2006/0086584 A1 | 4/2006 | Maucher et al. | |
| 2013/0230385 A1* | 9/2013 | Lindemann | F16D 33/18 415/122.1 |
| 2014/0097055 A1 | 4/2014 | Lindemann et al. | |

OTHER PUBLICATIONS

International Search Report for Corresponding International Application No. PCT/US2015/051058.

* cited by examiner

*Primary Examiner* — Carlos A Rivera
*Assistant Examiner* — Jesse M Prager
(74) *Attorney, Agent, or Firm* — Davidson, Davidson & Kappel, LLC

(57) ABSTRACT

A torque converter is provided. The torque converter includes a turbine including a turbine shell including a radially extending turbine shell wall, an impeller including an impeller shell including a radially extending impeller shell wall, a diaphragm spring rotationally fixed to one of the turbine and the impeller, and a friction material fixed to the diaphragm spring. The radially extending turbine shell wall and the radially extending impeller shell wall are engageable via the friction material and the diaphragm spring to form a lockup clutch. A method of forming a torque converter is also provided.

14 Claims, 6 Drawing Sheets

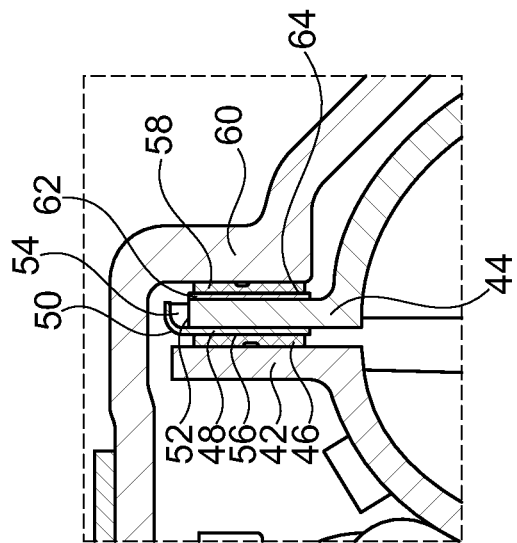
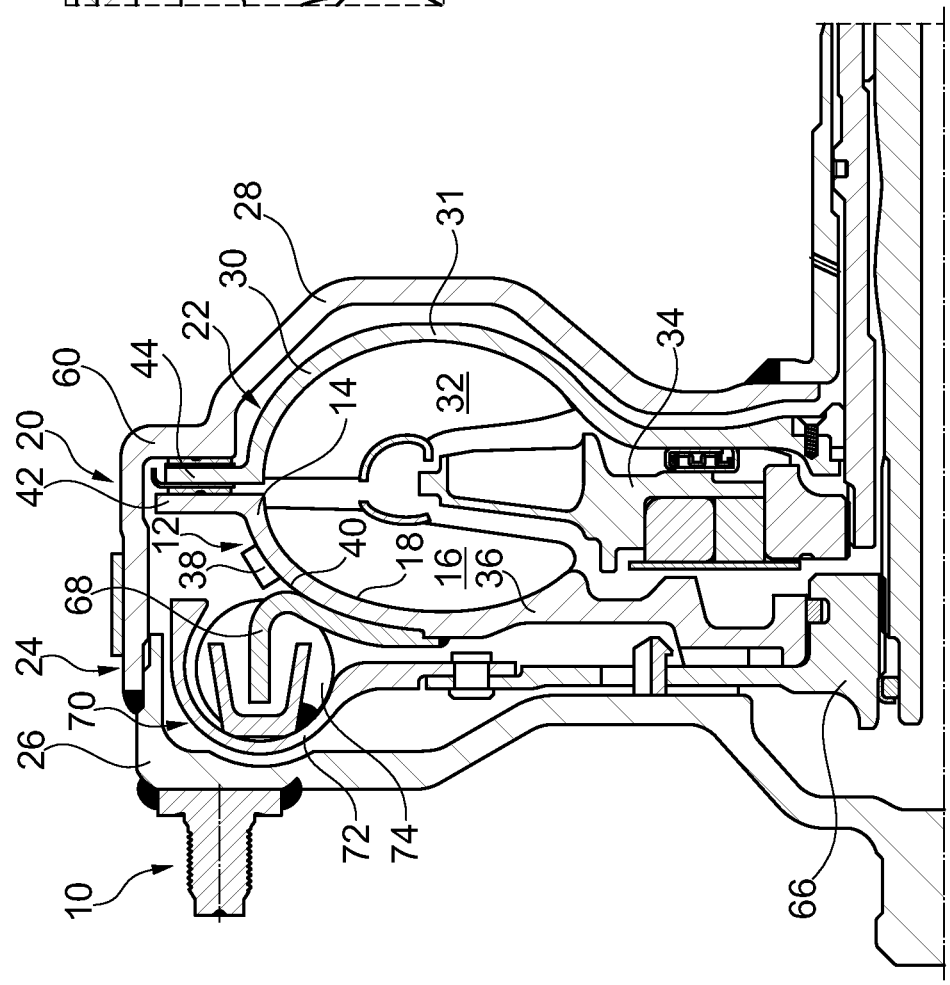
Fig. 1b
Fig. 1a

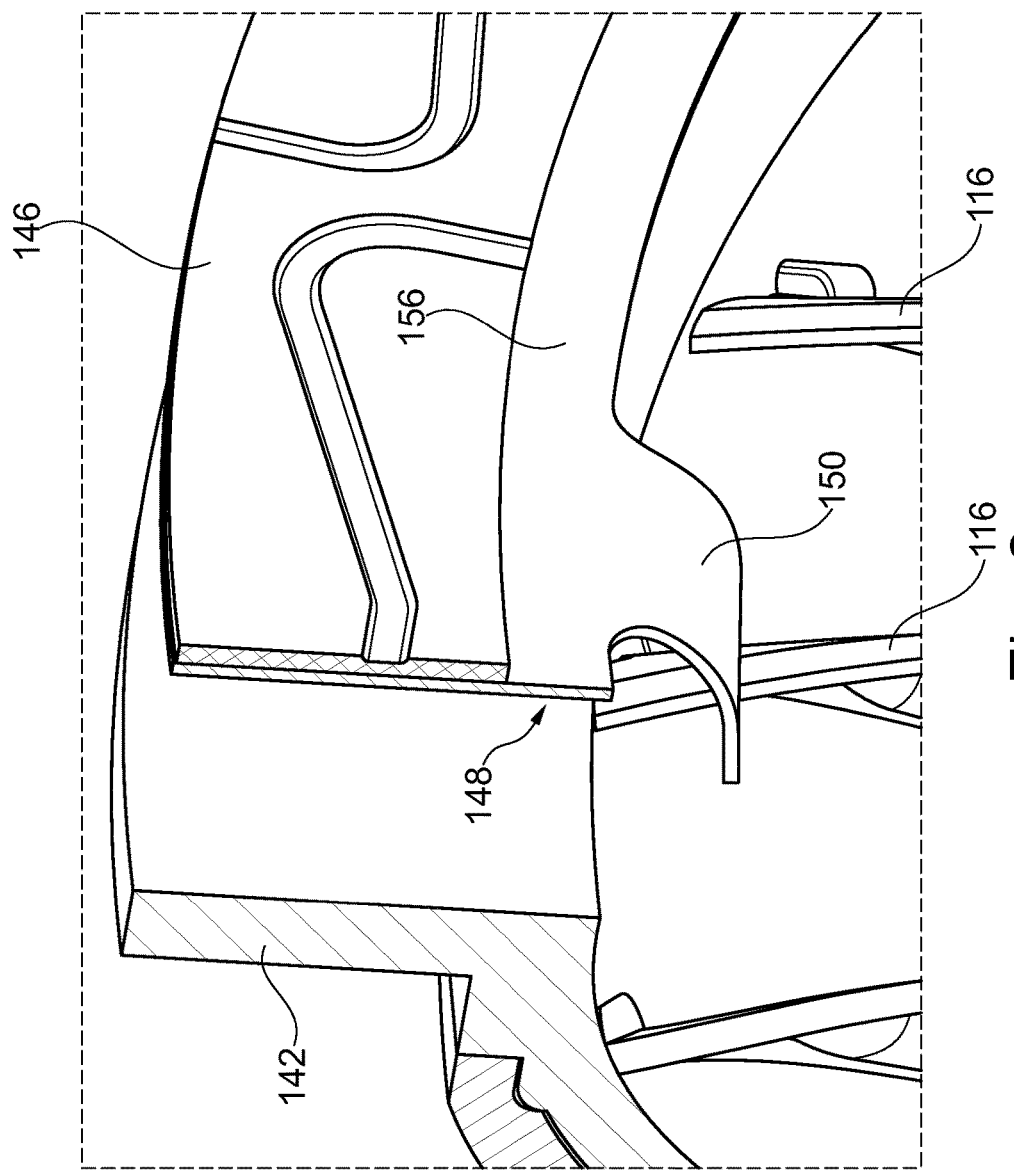

TORQUE CONVERTER INCLUDING AXIALLY MOVABLE TURBINE AND FRICTION MATERIAL BONDED TO DIAPHRAGM SPRING

This claims the benefit to U.S. Provisional Patent Application No. 62/054,165 filed Sep. 23, 2014, which is hereby incorporated by reference herein.

The present disclosure relates generally to torque converters and more specifically torque converters including axially movable turbines.

BACKGROUND

Torque converters in which a lockup clutch is provided by frictional engagement between a radially extending wall of a turbine and a radially extending wall of an impeller shell utilize friction material bonded to one of the turbine or the impeller shell for clutch engagement. One example is shown in U.S. Publication No. 2013/0230385.

SUMMARY OF THE INVENTION

Torque converters in which a lockup clutch is provided by frictional engagement between a radially extending wall of a turbine and a radially extending wall of an impeller shell have potential for poor clutch engagement due to the gap between the friction material and the friction surface that can exist during coast condition. The gap increases if the turbine and/or the impeller shell moves axially and the friction material lifts off the friction surface and the gap increases. This allows for fluid flow and the clutch engagement suffers due to the lack of pressure difference being created across the turbine.

A torque converter is provided is accordance with an object of the invention. The torque converter includes a turbine including a turbine shell including a radially extending turbine shell wall, an impeller including an impeller shell including a radially extending impeller shell wall, a diaphragm spring rotationally fixed to one of the turbine and the impeller, and a friction material fixed to the diaphragm spring. The radially extending turbine shell wall and the radially extending impeller shell wall are engageable via the friction material and the diaphragm spring to form a lockup clutch.

A method of forming a torque converter is also provided. The method includes rotationally fixing a diaphragm spring to one of a turbine or an impeller and fixing a friction material to the diaphragm spring. The turbine includes a turbine shell including a radially extending turbine shell wall. The impeller includes an impeller shell including a radially extending impeller shell wall. The radially extending turbine shell wall and radially extending impeller shell wall are engageable via the friction material and the diaphragm spring to form a lockup clutch.

BRIEF DESCRIPTION OF THE DRAWINGS

The present invention is described below by reference to the following drawings, in which:

FIG. 1a shows a half cross-sectional view of a torque converter in accordance with a first embodiment of the present invention;

FIG. 1b shows an enlarged view of a lockup clutch of the torque converter shown in FIG. 1a;

FIG. 2b shows a cross-sectional perspective view of a diaphragm spring being connected to a turbine shell of the torque converter shown in FIG. 2a; and FIG. 2c shows an exploded cross-sectional perspective view of the diaphragm spring and turbine shell of FIG. 2b.

DETAILED DESCRIPTION

Figure 1C:
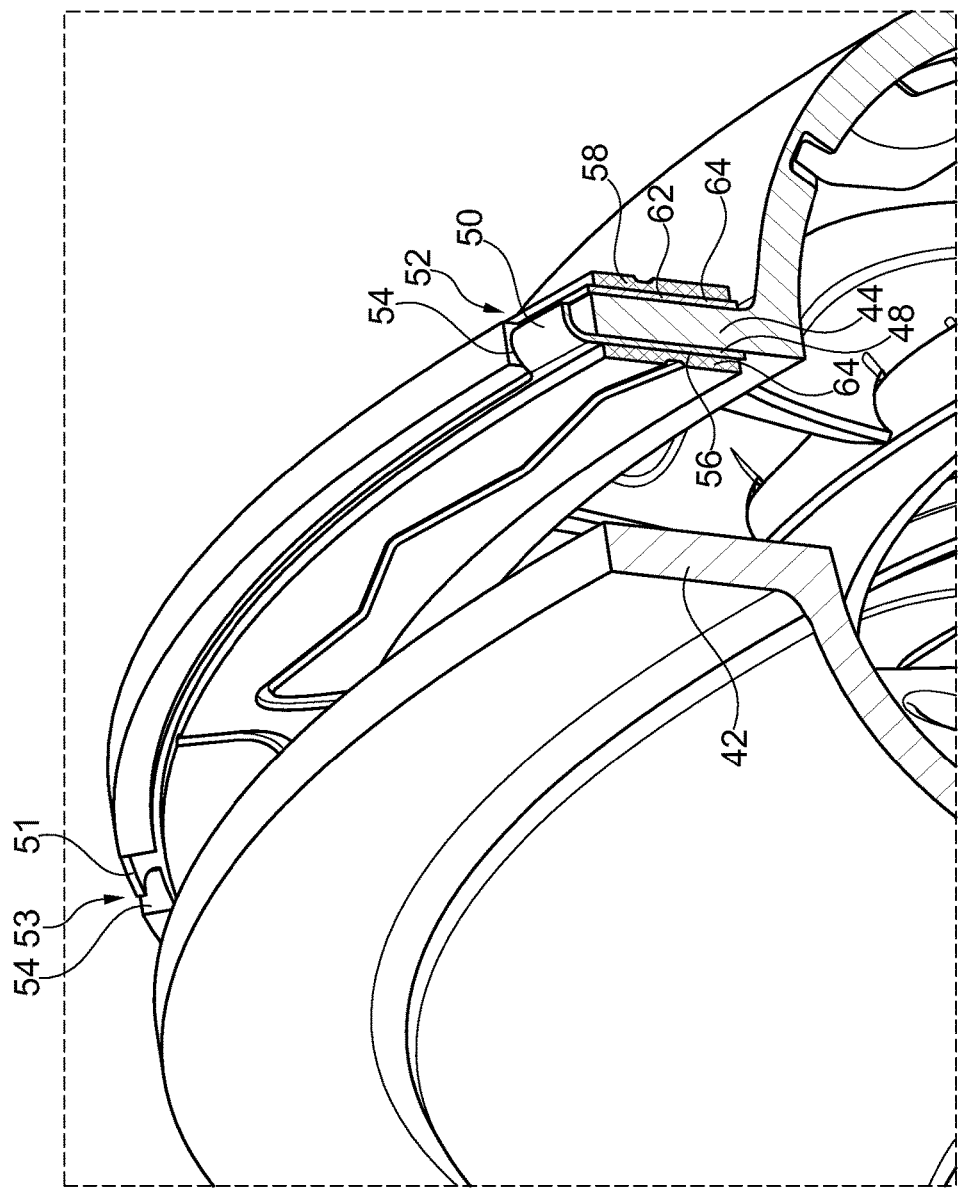
FIG. 1c shows a cross-sectional perspective view of diaphragm springs being connected to an impeller shell of the lockup clutch shown in FIG. 1b.

The present disclosure provides bonded springs as clutch plates. Because the springs are flexible, they can be deflected away to allow flow during an unlocked condition but create a seal between the turbine piston and impeller to prevent flow for increased apply pressure and assured lockup in a coast condition. The clutch plates may be in driving engagement on the turbine and/or impeller by radially outer axially extending tabs and tabs extending between blades of the turbine and/or impeller.

FIG. 1a shows a half cross-sectional view of a torque converter 10 in accordance with a first embodiment of the present invention. Torque converter 10 includes a turbine 12, which includes a turbine shell 14 and a plurality of turbine blades 16 fixed on a first axial side 18 of turbine shell 14. Turbine 12, which forms a first piston of a lockup clutch 20 of torque converter 10, is axially movable toward and away from an impeller 22 to engage and disengage turbine 12 from impeller 22 and a cover 24 of torque converter 10. Cover 24 includes a front cover 26 for connecting to a crankshaft of an internal combustion engine and a rear cover 28 surrounding impeller 22. Front cover 26 and rear cover 28 are both substantially cup shaped and are joined by providing an axial extension of front portion 26 radially inside of an axial extension of rear cover 28 and then welding the axial extensions together. Impeller 22, which is axially movable and forms a second piston of lockup clutch 20, includes an impeller shell 30 having a rounded blade support portion 31 supporting a plurality of impeller blades 32 on an inner axial surface thereof facing turbine 12. Torque converter 10 also includes a stator 34 between turbine 12 and impeller 22.

Turbine shell 14 includes a rounded blade support portion 36 supporting turbine blades 16 on axial side 18 thereof facing impeller 22. Turbine blades 16 may be connected to turbine shell 14 via blade tabs 38 that are inserted in slots passing through turbine shell 14 and bent to engage a surface 40 of turbine shell 14 facing away from turbine blades 16. In a preferred embodiment, after blades 16 are connected to turbine shell 14 by tabs 38, blades 16 are brazed to turbine shell 14. The brazing may be accomplished as described in U.S. Pat. No. 7,918,645.

Figure 1D:
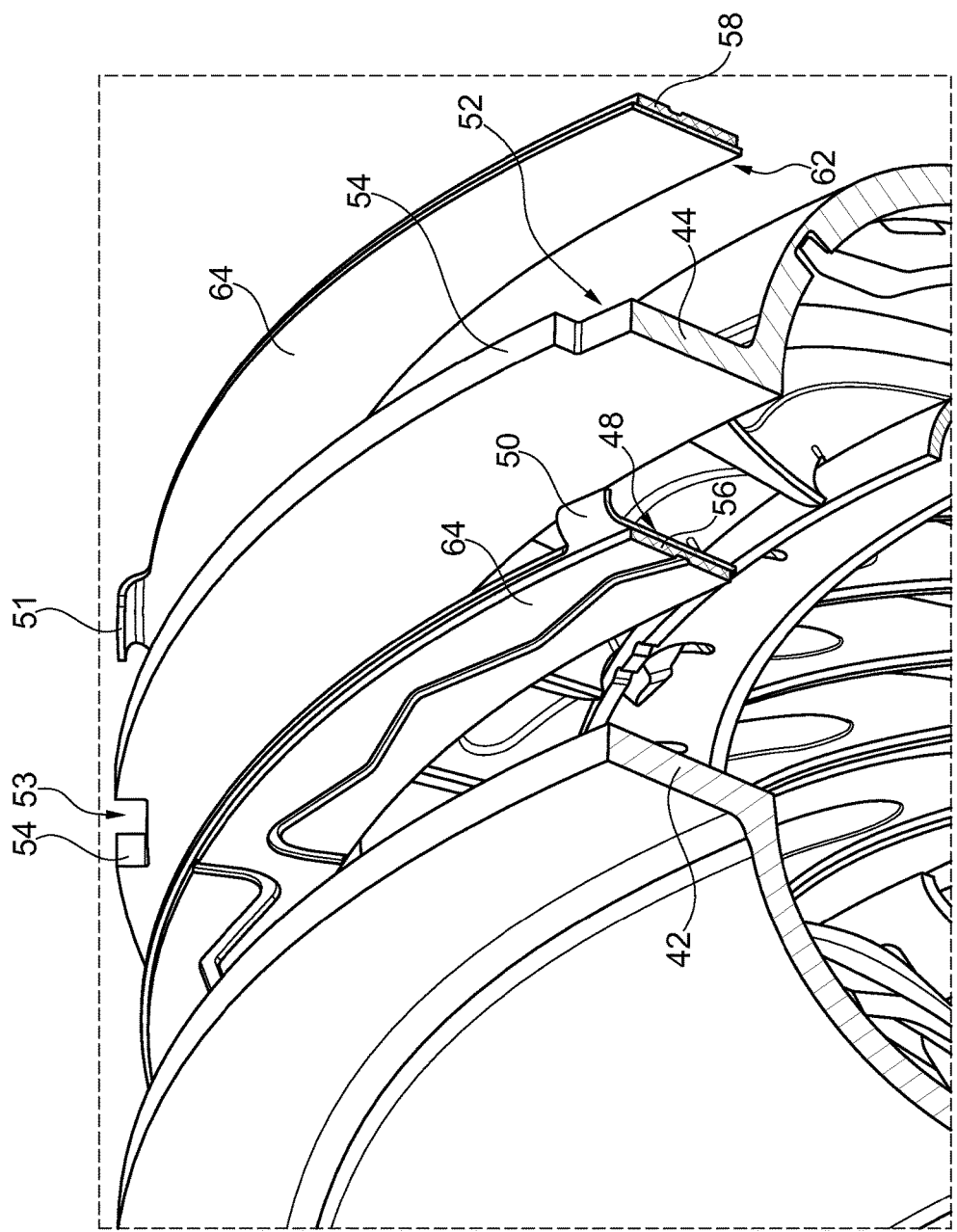
FIG. 1d shows an exploded cross-sectional perspective view of the diaphragm spring and impeller shell of FIG. 1c.

FIG. 1b shows an enlarged view of lockup clutch 20. Turbine shell 14 further includes an outer radially extending turbine shell wall 42, which is annularly shaped, radially protruding from blade support portion 36 and impeller shell 30 further includes a similarly shaped outer radially extending impeller shell wall 44 radially aligned with outer radially extending turbine shell wall 42. A friction material 46, in the form of a ring material ring extending around a center axis of torque converter 10, is provided axially between outer radially extending turbine shell wall 42 and outer radially extending impeller shell wall 44 for frictionally connecting outer radially extending turbine shell wall 42 and outer radially extending impeller shell wall 44. Friction material 46 is held axially between outer radially extending turbine shell wall 42 and outer radially extending impeller shell wall 44 by a diaphragm spring 48 rotationally fixed, but not axially fixed, to impeller 22 via impeller shell wall 44. More specifically, diaphragm spring 48 includes a plurality of axially extending tabs 50 spaced circumferentially from each other at an outer radial end thereof that are rotationally fixed to an outer radial end of impeller shell wall 44. The outer radial end of impeller shell wall 44 includes a plurality of notches 52 that are formed as spaces circumferentially between radially extending projections 54. Tabs 50, which are shown in further detail in the perspective views of FIGS. 1c and 1d, extend into notches 52 to contact the circumferential edges of projections 54 to rotationally fix diaphragm spring 48 to impeller shell wall 44. Notches 52 provide centering support as well as initial rotational resistance upon engagement of lockup clutch 20. A first axial surface of a radially extending portion 56 of diaphragm spring 48 rests against an axial surface of impeller shell wall 44 facing turbine shell wall 42. Friction material 46 is bonded to a second axial surface of radially extending portion 56 facing turbine shell wall 42 via adhesive.

A further friction material 58, in the form of a ring material ring extending around the center axis of torque converter 10, is provided axially between an outer radially extending rear cover wall 60 of rear cover 28 and impeller shell wall 44 for frictionally connecting rear cover wall 60 and impeller shell wall 44. Friction material 58 is held axially between rear cover wall 60 and impeller shell wall 44 by a further diaphragm spring 62 rotationally fixed, but not axially fixed, to impeller 22 via impeller shell wall 44. More specifically, similar to diaphragm spring 48, diaphragm spring 62 includes a plurality of axially extending tabs 51 (FIGS. 1c and 1d) spaced circumferentially from each other at an outer radial end thereof that are rotationally fixed to the outer radial end of impeller shell wall 44 by extending axially into notches 53 that are formed as spaces circumferentially between radially and circumferentially extending projections 54. Notches 53 are circumferentially offset from notches 52. A first axial surface of a radially extending portion 64 of diaphragm spring 62 rests against an axial surface of impeller shell wall 44 facing rear cover wall 60. Friction material 58 is bonded to a second axial surface of radially extending portion 64 facing rear cover wall 60 via adhesive. As the pistons—turbine 12 and impeller 22—move, diaphragm springs 48, 62 provide spring force sufficient to close the gap between turbine 12 and impeller 22 and impeller 22 and rear cover 28. With these gaps being restricted, a positive pressure can be created and clutch 20 can be engaged.

Referring to FIGS. 1a to 1d, when the pressure in torque converter 10 forces turbine 12 towards impeller 22, friction material 46 is clamped between turbine shell wall 42 and impeller shell wall 44 and friction material 58 is clamped between impeller shell wall 44 and rear cover wall 60. This engagement, coupled with diaphragm springs 48, 62 rotationally engaging impeller shell wall 44 engages lockup clutch 20. Turbine 12 is axially slidable toward and away from impeller 22 based on specified pressure settings in torque converter 10. When lockup clutch 20 is engaged, torque input into front cover 26 by the engine crankshaft is transferred to a torque output flange 66 when turbine 12 and impeller 22 have the same rotational velocity. Specifically, a drive tab 68 fixed to rounded portion 31 of turbine shell 14 drives a damper 70 fixed to torque output flange 66, which includes a splined inner circumferential surface for connecting to a transmission input shaft. Advantageously, spring 48 may be deflected away from turbine shell wall 42 to allow flow when lockup clutch 20 is disengaged, but create a seal between turbine 12 and impeller 22 to prevent flow for increased apply pressure and assured lockup in a coast condition.

In this embodiment, damper 70 includes a spring retainer 72 for retaining a plurality of circumferentially spaced springs 74 that are rotationally driven by drive tab 68. Spring retainer 72 is fixed to torque output flange 66. During operation of torque converter 10, drive tab 68 circumferentially drivingly engages damper 70 via springs 74 by a projections extending into spaces circumferentially between springs 74. As turbine 12 is driven by impeller 22 about the center axis of torque converter 10, either through friction material 46, 58 and diaphragm springs 48, 62 or through fluid flow between blades 16, 32, turbine 12 transfers torque to damper 70 via drive tab 68.

Figure 2A:
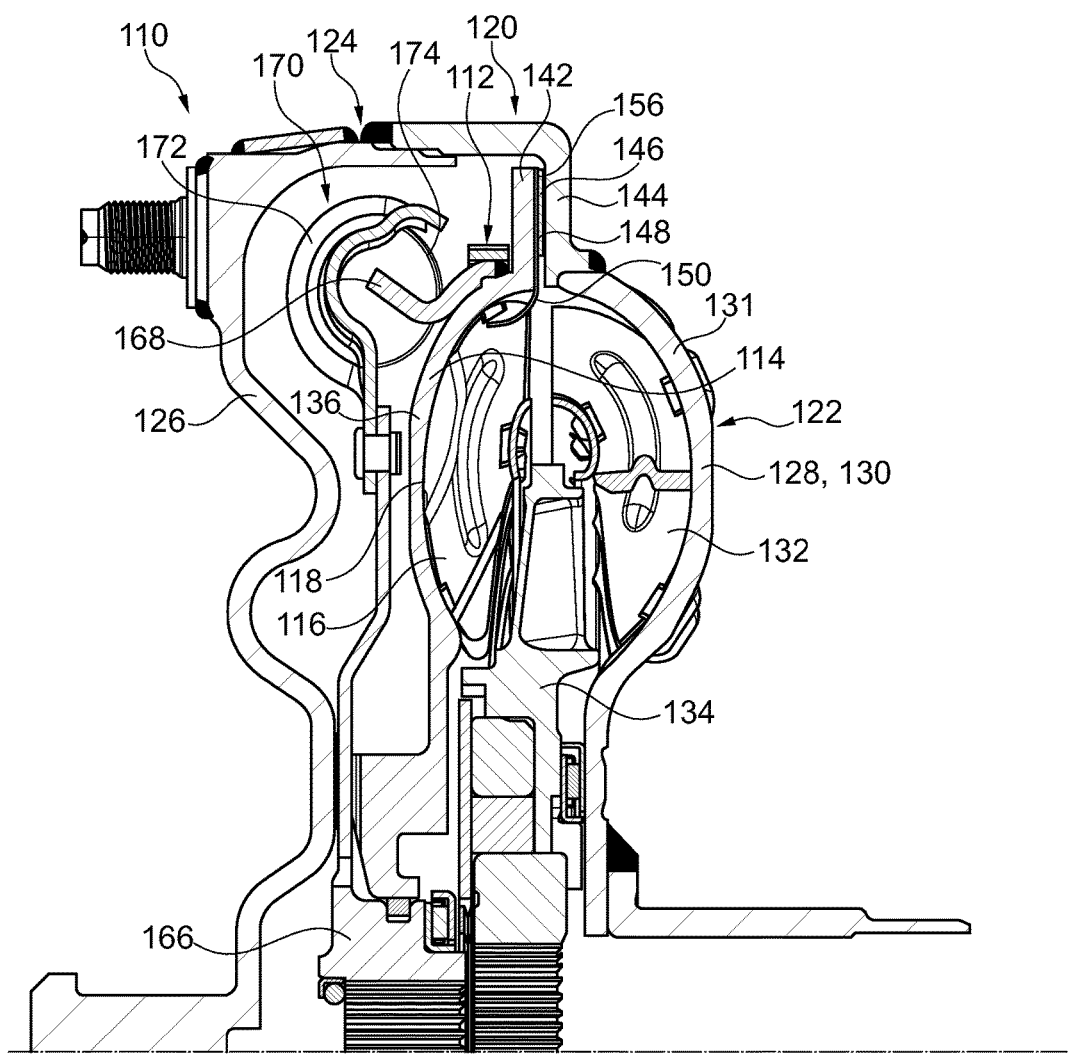
FIG. 2a shows a half cross-sectional view of a torque converter in accordance with a second embodiment of the present invention.

FIG. 2a shows a half cross-sectional view of a torque converter 110 in accordance with a second embodiment of the present invention. Torque converter 110 includes a turbine 112, which includes a turbine shell 114 and a plurality of turbine blades 116 fixed on a first axial side 118 of turbine shell 114. Turbine 112, which forms the piston of a lockup clutch 120 of torque converter 110, is axially movable toward and away from an impeller 122 to engage and disengage turbine 112 from impeller 122 and a cover 124 of torque converter 110. Cover 124 includes a front cover 126 for connecting to a crankshaft of an internal combustion engine and a rear cover 128 surrounding impeller 122 and forming a shell 130 of impeller 122. Front cover 126 and rear cover 128 are both substantially cup shaped and are joined by providing an axial extension of front portion 126 radially inside of an axial extension of rear cover 128 and then welding the axial extensions together. Impeller shell 130 includes a rounded blade support portion 131 supporting a plurality of impeller blades 132 on an inner axial surface thereof facing turbine 112. Torque converter 110 also includes a stator 134 between turbine 112 and impeller 122.

Turbine shell 114 includes a rounded blade support portion 136 supporting turbine blades 116 on axial side 118 thereof facing impeller 122. Turbine blades 116 may be connected to turbine shell 114 via blade tabs that are inserted in slots passing through turbine shell 114 and bent to engage a surface 140 of turbine shell 114 facing away from turbine blades 116. In a preferred embodiment, after blades 116 are connected to turbine shell 114 by tabs, blades 116 are brazed to turbine shell 114.

Figure 2B:
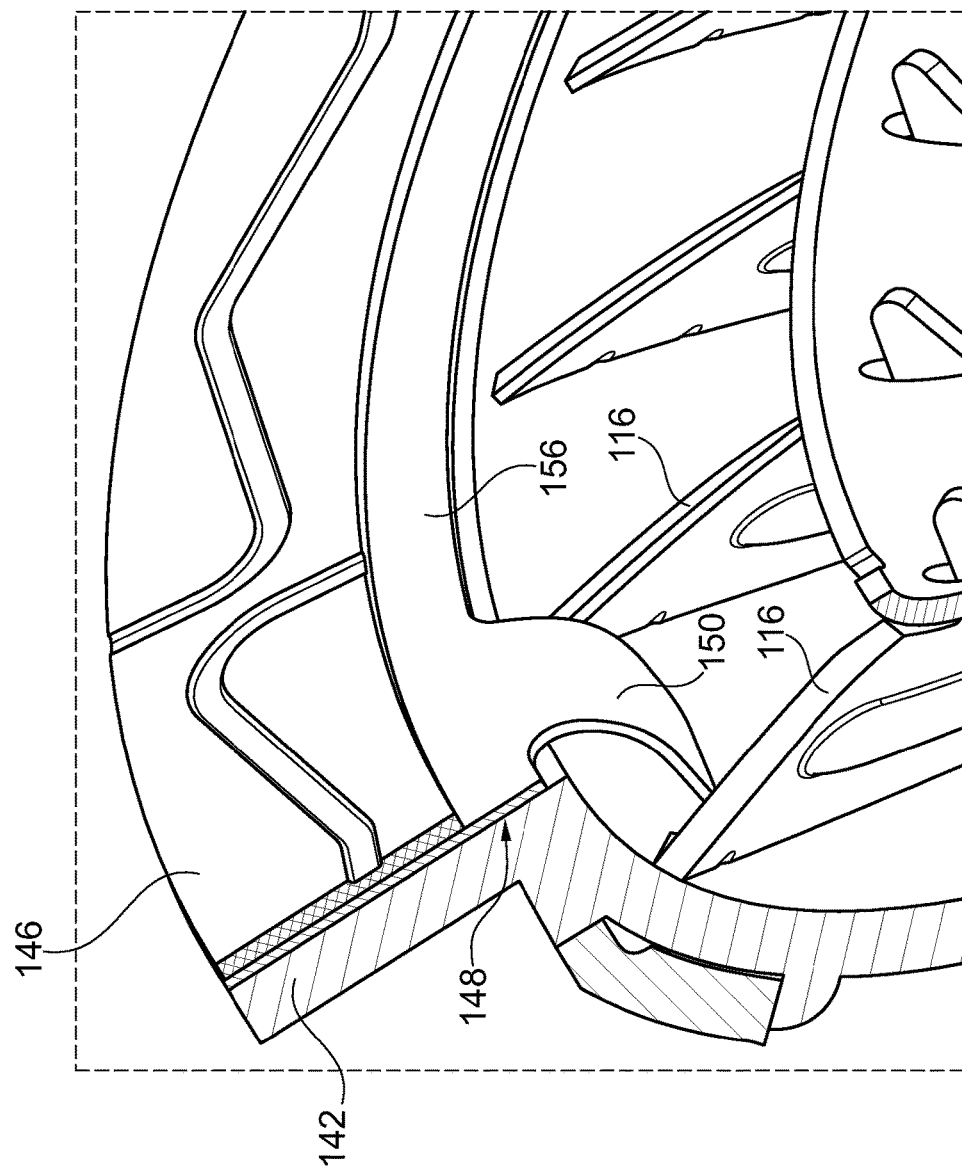

Like turbine shell 14, turbine shell 114 further includes an outer radially extending turbine shell wall 142, which is annularly shaped, radially protruding from blade support portion 136 and impeller shell 130 further includes a similarly shaped outer radially extending impeller shell wall 144 radially aligned with outer radially extending turbine shell wall 142. A friction material 146, in the form of a ring material ring extending around a center axis of torque converter 110, is provided axially between outer radially extending turbine shell wall 142 and outer radially extending impeller shell wall 144 for frictionally connecting outer radially extending turbine shell wall 142 and outer radially extending impeller shell wall 144. Friction material 146 is held axially between outer radially extending turbine shell wall 142 and outer radially extending impeller shell wall 144 by a diaphragm spring 148 rotationally fixed, but not axially fixed, to turbine 12 via turbine shell wall 142. More specifically, diaphragm spring 148 includes a plurality of axially extending tabs 150 spaced circumferentially from each other at an inner radial end thereof that are rotationally fixed to turbine blades 116. Tabs 150, which are shown in further detail in the perspective view of FIGS. 2b and 2c, extend into spaces circumferentially between turbine blades 116 to contact the circumferential edges of turbine blades 116 to rotationally fix diaphragm spring 148 to turbine 112. A first axial surface of a radially extending portion 156 of diaphragm spring 148 rests against an axial surface of turbine shell wall 142 facing impeller shell wall 144. Friction material 146 is bonded to a second axial surface of radially extending portion 156 facing impeller shell wall 144 via adhesive. As the piston—turbine 112—moves, diaphragm spring 148, provides spring force sufficient to close the gap between turbine 112 and impeller 122. With the gap being restricted, a positive pressure can be created and clutch 120 can be engaged.

As similarly described above with respect to the first embodiment, when the pressure in torque converter 110 forces turbine 112 towards impeller 122, friction material 146 is clamped between turbine shell wall 142 and impeller shell wall 144. This engagement, coupled with diaphragm spring 148 rotationally engaging turbine 112 via turbine blades 116, engages lockup clutch 120. Turbine 112 is axially slidable toward and away from impeller 122 based on specified pressure settings in torque converter 110. When lockup clutch 120 is engaged, torque input into front cover 126 by the engine crankshaft is transferred to a torque output flange 166 when turbine 112 and impeller 122 have the same rotational velocity. Specifically, a drive tab 168 fixed to rounded portion 131 of turbine shell 114 drives a damper 170 fixed to torque output flange 166, which includes a splined inner circumferential surface for connecting to a transmission input shaft. Advantageously, spring 148 may be deflected away from impeller shell wall 144 to allow flow when lockup clutch 120 is disengaged, but create a seal between turbine 112 and impeller 122 to prevent flow for increased apply pressure and assured lockup in a coast condition.

In this embodiment, damper 170 includes a spring retainer 172 for retaining a plurality of circumferentially spaced springs 174 that are rotationally driven by drive tab 168. Spring retainer 172 is fixed to torque output flange 166. During operation of torque converter 110, drive tab 168 circumferentially drivingly engages damper 170 via springs 174 by a projections extending into spaces circumferentially between springs 174. As turbine 112 is driven by impeller 122 about the center axis of torque converter 110, either through friction material 146 and diaphragm spring 148 or through fluid flow between blades 116, 132, turbine 112 transfers torque to damper 170 via drive tab 168.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter comprising:
   a turbine including a turbine shell including a radially extending turbine shell wall, the turbine including turbine blades fixed to the turbine shell;
   an impeller including an impeller shell including a radially extending impeller shell wall;
   a diaphragm spring rotationally fixed to one of the turbine and the impeller; and
   a friction material fixed to the diaphragm spring, the radially extending turbine shell wall and radially extending impeller shell wall being engageable via the friction material and the diaphragm spring to form a lockup clutch,
   the diaphragm spring including a plurality of axially extending tabs, the plurality of axially extending tabs extending into spaces circumferentially between turbine blades of the turbine to contact circumferential edges of the turbine blades to rotationally fix the diaphragm spring to the turbine, the plurality of axially extending tabs being positioned axially between the turbine shell and the impeller shell.

2. The torque converter as recited in claim 1 wherein the turbine shell forms an axially movable piston.

3. The torque converter as recited in claim 2 wherein the impeller shell forms an axially movable piston.

4. The torque converter as recited in claim 3 further comprising a rear cover surrounding the impeller.

5. The torque converter as recited in claim 1 further comprising a damper rotationally fixed to the turbine shell, the damper configured for transmitting torque from the impeller to a transmission input shaft during engagement of the lockup clutch.

6. The torque converter as recited in claim 1 wherein the diaphragm spring is rotationally fixed to the turbine blades, the friction material being on an axial side of the diaphragm spring facing the radially extending impeller shell wall for contacting the radially extending impeller shell wall during engagement of the lockup clutch.

7. A torque converter comprising:
   a turbine including a turbine shell including a radially extending turbine shell wall;
   an impeller including an impeller shell including a radially extending impeller shell wall;
   a diaphragm spring rotationally fixed to one of the turbine and the impeller; and
   a friction material fixed to the diaphragm spring, the radially extending turbine shell wall and radially extending impeller shell wall being engageable via the friction material and the diaphragm spring to form a lockup clutch,
   wherein the radially extending impeller shell wall includes notches formed in a radially outer end thereof, the diaphragm spring being rotationally fixed to the impeller via the notches, the friction material being on an axial side of the diaphragm spring facing the radially extending turbine shell wall for contacting the radially extending turbine shell wall during engagement of the lockup clutch.

8. The torque converter as recited in claim 7 further comprising a second diaphragm spring rotationally fixed to the impeller and a further friction material fixed to the second diaphragm spring, the second diaphragm spring being on an opposite axial side of the impeller shell as the diaphragm spring.

9. The torque converter as recited in claim 8 further comprising a rear cover surrounding the impeller shell, the further friction material arranged on an axial side of the second diaphragm spring facing the rear cover for contacting the rear cover during engagement of the lockup clutch.

10. A method of forming a torque converter comprising:
rotationally fixing a diaphragm spring to one of a turbine or an impeller; and
fixing a friction material to the diaphragm spring,
the turbine including a turbine shell including a radially extending turbine shell wall, the turbine including turbine blades fixed to the turbine shell,
the impeller including an impeller shell including a radially extending impeller shell wall,
the radially extending turbine shell wall and radially extending impeller shell wall being engageable via the friction material and the diaphragm spring to form a lockup clutch,
the diaphragm spring includes tabs,
wherein one of:
the rotational fixing includes inserting the tabs of the diaphragm spring into notches formed in the radially extending impeller shell wall; or
the tabs comprise a plurality of axially extending tab and the rotational fixing includes inserting the plurality of axially extending tabs into spaces circumferentially between the turbine blades to contact circumferential edges of the turbine blades to rotationally fix the diaphragm spring to the turbine, the plurality of axially extending tabs being positioned axially between the turbine shell and the impeller shell.

11. The method as recited in claim 10 wherein the rotationally fixing includes inserting the tabs of the diaphragm spring into the notches formed in the radially extending impeller shell wall.

12. The method as recited in claim 10, wherein the tabs comprise the plurality of axially extending tabs and the rotational fixing includes inserting the plurality of axially extending tabs into the spaces circumferentially between the turbine blades to contact the circumferential edges of the turbine blades to rotationally fix the diaphragm spring to the turbine, the plurality of axially extending tabs being positioned axially between the turbine shell and the impeller shell, the rotationally fixing includes inserting the plurality of axially extending tabs of the diaphragm spring into the spaces circumferentially between the turbine blades to contact the circumferential edges of the turbine blades to rotationally fix the diaphragm spring to the turbine, and the plurality of axially extending tabs are positioned axially between the turbine shell and the impeller shell.

13. The method as recited in claim 10 wherein the fixing the friction material to the diaphragm spring includes bonding the friction material to the diaphragm spring via adhesive.

14. The torque converter as recited in claim 1 wherein the diaphragm spring provides spring force to close a gap between the turbine and the impeller so as to engage the lockup clutch.

* * * * *